United States Patent
Chen et al.

(10) Patent No.: US 8,776,554 B2
(45) Date of Patent: Jul. 15, 2014

(54) METHOD OF PROCESSING LEATHER MATERIAL

(71) Applicant: Lear Corporation, Southfield, MI (US)

(72) Inventors: Pusheng Chen, Novi, MI (US); Thomas A. Welch, Sr., Ortonville, MI (US); Louella Ann Patterson, Goodells, MI (US); Ashford Allen Galbreath, Troy, MI (US); Paul S. Severinski, Brownstown, MI (US)

(73) Assignee: Lear Corporation, Southfield, MI (US)

( * ) Notice: Subject to any disclaimer, the term of this patent is extended or adjusted under 35 U.S.C. 154(b) by 50 days.

(21) Appl. No.: 13/682,860

(22) Filed: Nov. 21, 2012

(65) Prior Publication Data

US 2014/0137610 A1     May 22, 2014

(51) Int. Cl.
    *C14B 1/58*      (2006.01)
(52) U.S. Cl.
    CPC .................................. *C14B 1/58* (2013.01)
    USPC .................................................. 69/21
(58) Field of Classification Search
    USPC .................... 69/33, 46, 47, 19.1, 21
    See application file for complete search history.

(56) References Cited

U.S. PATENT DOCUMENTS

| | | | |
|---|---|---|---|
| 2,884,777 A * | 5/1959 | Kremen | 69/42 |
| 3,643,339 A | 2/1972 | Plechac et al. | |
| 4,140,827 A | 2/1979 | Willwerth et al. | |
| 4,233,021 A | 11/1980 | Spurr | |
| 4,442,687 A | 4/1984 | Muentjes | |
| 4,559,793 A | 12/1985 | Geweniger | |
| 4,802,349 A | 2/1989 | Jennrich et al. | |
| 4,901,542 A * | 2/1990 | Gidge et al. | 69/48 |
| 5,184,487 A * | 2/1993 | Corner | 69/19.1 |
| 6,786,067 B2 | 9/2004 | Stupecky | |
| 6,854,301 B1 * | 2/2005 | Romanski | 69/48 |
| 2005/0193780 A1 * | 9/2005 | Cassarino | 69/1 |
| 2010/0263235 A1 * | 10/2010 | Schaefer | 36/109 |

FOREIGN PATENT DOCUMENTS

| | | | |
|---|---|---|---|
| EP | 0025144 A1 | 3/1981 | |
| EP | 504579 A1 * | 9/1992 | C14B 1/40 |

* cited by examiner

*Primary Examiner* — Shaun R Hurley
(74) *Attorney, Agent, or Firm* — Brooks Kushman P.C.

(57) ABSTRACT

A method of processing a leather material. The method may include providing a tanned and dried leather material and pre-stretching the leather material after the leather material is dried.

20 Claims, 2 Drawing Sheets

METHOD OF PROCESSING LEATHER MATERIAL

TECHNICAL FIELD

This patent application relates to a method of processing a leather material.

BACKGROUND

A device for fleshing, stretching, and drying leather is disclosed in U.S. Pat. No. 6,786,067.

SUMMARY

In at least one embodiment, a method of processing a leather material is provided. The method may include providing a tanned leather material, drying the leather material, pre-stretching the leather material, cutting the leather material into a set of panels, and assembling at least some members of the set of panels into a leather article. The step of pre-stretching the hide may occur after drying the leather material and before assembling the panels.

In at least one embodiment, a method of processing a leather material is provided. The method may include providing a tanned leather hide, drying the hide after tanning, pre-stretching the hide after the hide is dried, cutting the hide into first and second panels after pre-stretching the hide, and stitching the first and second panels together to form a leather article.

In at least one embodiment, a method of processing a leather material is provided. The method may include providing a tanned leather material, drying the leather material, pre-stretching the leather material with first and second pairs of rollers, cutting the leather material into a set of panels, and assembling at least some members of the set of panels to form a leather article. The step of pre-stretching the leather material may occur after drying the leather material and before assembling members of set of panels.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
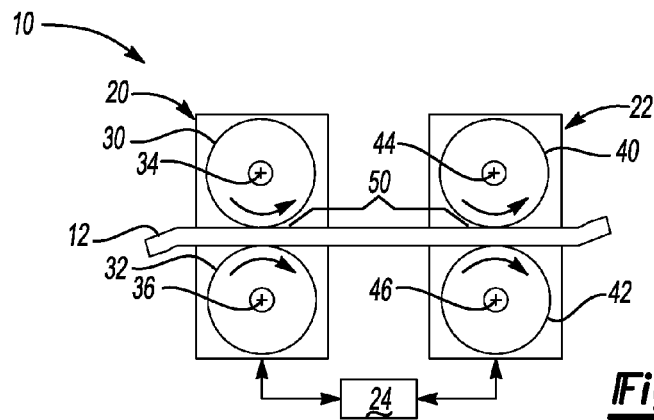
FIGS. 1-4 are side views of a leather hide and exemplary pre-stretching apparatuses.

Referring to FIG. 1, an exemplary pre-stretching apparatus 10 for processing a leather material 12 is shown. Leather or leather material 12 may be made by tanning animal rawhide. For instance, animal rawhide may be tanned to convert the rawhide into a more stable or preserved state and then dried before being finished, cut, and assembled into an article. A tanned leather hide or "hide" may be used to refer to a tanned leather hide or tanned leather material that has not undergone finish cutting or that has not been cut from the hide into a desired shape. As such, a tanned leather hide may generally be a large, irregularly shaped piece of leather material.

One use of leather material 12 is in the manufacture of seat trim covers, which may be used in motor vehicle seats or furniture. Seat trim covers may be manufactured by stitching together multiple leather panels that may be cut from one or more tanned, dried, and finished leather hides. The leather material 12 in a seat trim cover may stretch or elongate due to load forces, such as may be exerted by a seat occupant. Such stretching and elongation may result in undesirable wrinkles and bulges that may create an undesirable aesthetic appearance. Applicants have discovered that post-assembly stretching or elongation of the leather material 12 in a trim cover or manufactured leather article may be reduced or inhibited by pre-stretching the leather material 12 after tanning and drying but before assembling the article.

The pre-stretching apparatus 10 may include a first pair of rollers 20, a second pair of rollers 22, and a control system 24. The first pair of rollers 20 may include a first roller 30 and a second roller 32. The first and second rollers 30, 32 may be spaced apart from each other to provide a gap for receiving the leather material 12. The first and second rollers 30, 32 may be configured to rotate about first and second axes of rotation 34, 36, respectively. The first and second axes of rotation 34, 36 may extend generally parallel to each other. The first and second rollers 30, 32 may be configured to grip with the leather material 12. For example, the first and second rollers 30, 32 may be textured, knurled, grooved, or covered with a coating such as rubber or the like that may provide a desired amount of friction or grip with a surface of the leather material 12.

The second pair of rollers 22 may have a similar configuration as the first pair of rollers 20. For example, the second pair of rollers 22 may include a third roller 40 and a fourth roller 42. The third and fourth rollers 40, 42 may be spaced apart from each other to provide a gap for receiving the leather material 12. The third and fourth rollers 40, 42 may be configured to rotate about third and fourth axes of rotation 44, 46, respectively. The third and fourth axes of rotation 44, 46 may extend generally parallel to each other.

The control system 24 may be associated with the first and/or second pair of rollers 20, 22 to control its operation. For instance, the control system 24 may include one or more actuators, such as an electric motor, that may power or drive the first roller 30 and/or the second roller 32 to help feed the leather material 12 between and through the first pair of rollers 20. Similarly, the control system 24 may include one or more actuators, such as an electric motor, that may power or drive the third roller 40 and/or the fourth roller 42 to help feed the leather material 12 between and through the second pair of rollers 22. A clutch may be provided with the first and/or second rollers 30, 32 and/or the third and/or fourth rollers 40, 42 to help control rotation and limit the force that may be applied to the leather material 12 to inhibit tearing or damage of the leather material 12.

The first and second pairs of rollers 20, 22 may cooperate to pre-stretch the leather material 12. For example, the leather material 12 may be fed through and may engage the first and second pairs of rollers 20, 22. The first and second pairs of rollers 20, 22 may rotate at different speeds to exert tension on the leather material 12. For example, the third and/or fourth rollers 40, 42 may rotate faster than the first and second rollers 30, 32, thereby exerting tension on a region 50 of the leather material 12 disposed between the first and second pairs of rollers 20, 22.

Figure 2:
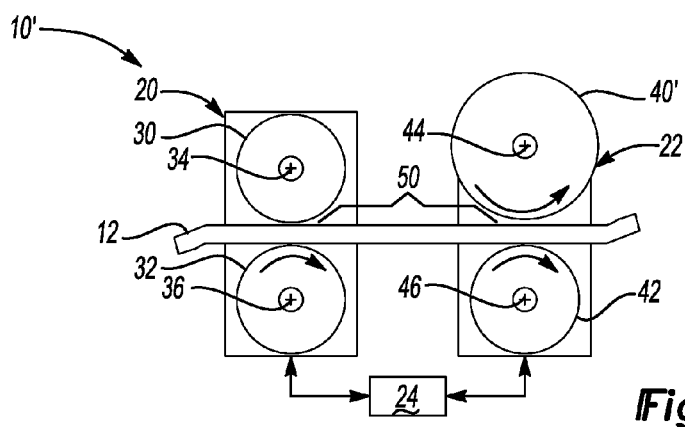

Referring to FIG. 2, another embodiment of a pre-stretching apparatus 10' is shown. In this embodiment, the third roller 40' has a larger diameter than the third roller 40 in FIG. 1. As such, the rollers 30, 32, 40', 42 may be driven or rotated at the same rotational speed about their respective axes rather than at different rotational speeds, yet tension may be exerted on the portion of the leather material 12 disposed between the first and second pairs of rollers 20, 22 due to the enlarged third roller 40'.

Figure 3:
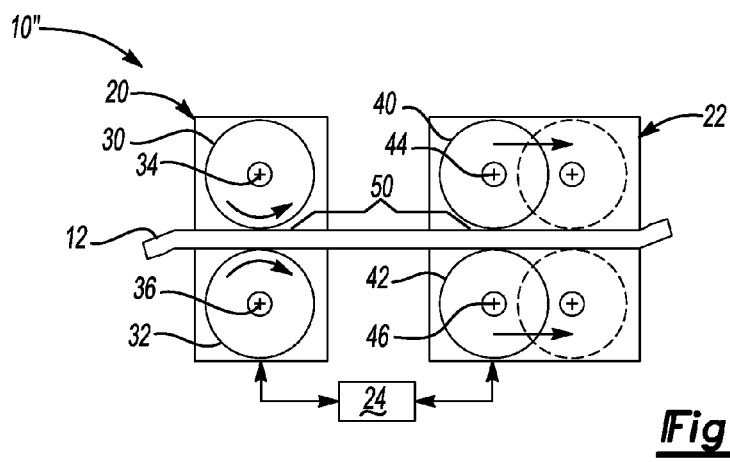

Referring to FIG. 3, another embodiment of a pre-stretching apparatus 10" is shown. In this embodiment, the first pair of rollers 20 and/or the second pair of rollers 22 may move with respect to each other. For instance, the first and second rollers 30, 32 may rotate about stationary first and second axes of rotation 34, 36, while the third and fourth rollers 40, 42 may rotate about non-stationary third and fourth axes of rotation 44, 46. In such an embodiment, the rollers 30, 32, 40, 42 may have the same diameter and may be driven or rotate at the same rotational speed. The leather material 12 may be pre-stretched by moving the second pair of rollers 22 away from the first pair of rollers 22. For instance, the control system 24 may actuate the second pair of rollers 22 linearly away from the first pair of rollers 20. Moreover, the third and fourth axes of rotation 44, 46 may remain stationary with respect to each other when the second pair of rollers 22 is actuated. As such, the second pair of rollers 22 may move in unison with respect to the first pair of rollers 20. In addition, tension may be applied or enhanced by inhibiting rotation of the first and second rollers 30, 32 while the second pair of rollers 22 is actuated away from the first pair of rollers 20. It is also contemplated that the first and second pairs of rollers 20, 22 could both move relative to each other to pre-stretch the leather material 12 in one or more embodiments.

Figure 4:
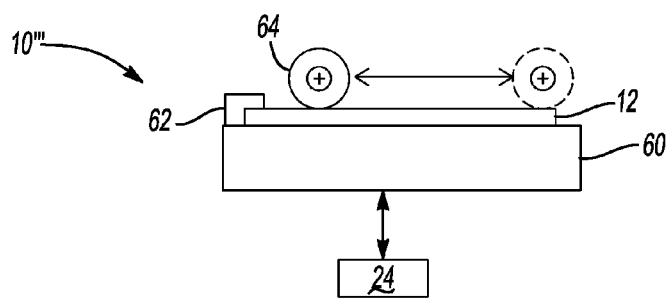

Referring to FIG. 4, another embodiment of a pre-stretching apparatus 10' is shown. In this embodiment, the leather material 12 is placed on a bed 60. The bed 60 may have a substantially planar surface that may engage and support the leather material 12. A clamp 62 may be disposed proximate the bed 60. The clamp 62 may hold at least a portion of the leather material 12 in a stationary position. A roller 64 may be rolled across the leather material 12 and may exert force against the bed 60, thereby squeezing the leather material 12 between the roller 64 and the bed 60. The roller 64 may be rolled back and forth across the leather material 12 a predetermined number of times or until the leather material 12 elongates by a desired amount. As a variation, two or more clamps or pre-stretching bars could clamp or engage the leather material 12 and at least one clamp or pre-stretching bar could be actuated to pre-stretch the leather material 12 in one or more directions.

Leather material 12 may be pre-stretched one or more times by any pre-stretching apparatus described above. For example, leather material 12 may be pre-stretched multiple times by a single type of pre-stretching apparatus or may be pre-stretched one or more times with different pre-stretching apparatuses.

Figure 5:
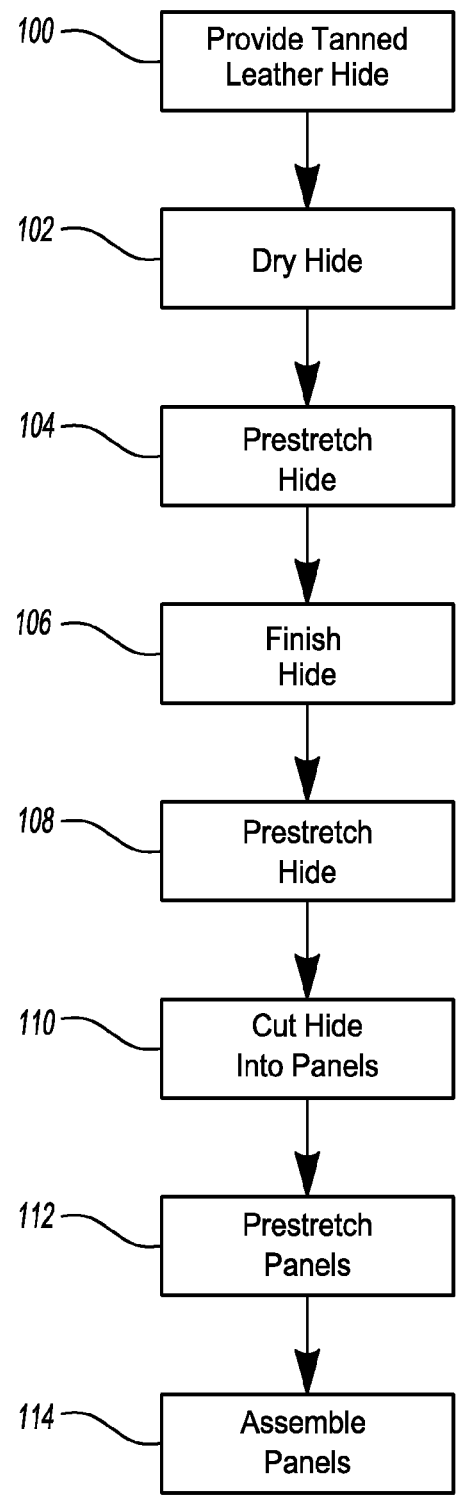
FIG. 5 is a flowchart of a method of processing a leather material.

Referring to FIG. 5, a flowchart of a method of processing and pre-stretching a leather material 12 is shown.

At 100, the method may begin by providing leather material 12 in the form of a tanned leather hide. An animal rawhide may be tanned using various tanning steps that are known by those skilled in the art. Such tanning steps may generally employ immersing and soaking the animal rawhide in a liquid tanning solution to chemically convert protein in the rawhide to a more stable and preserved state.

At 102, the tanned leather hide may be dried. The tanned leather hide may be removed from the liquid tanning solution and air dried or dried in a drying machine that may tumble the hide and provide heated air to accelerate the removal of moisture.

At 104, the hide may be pre-stretched. The hide may be pre-stretched by exerting a tensile and/or compressive force on the tanned and dried leather hide as previously discussed and may employ any pre-stretching apparatus previously discussed. Pre-stretching may occur after tanning and drying of the leather hide and before an article is assembled or made from the hide. Multiple pre-stretching steps may be employed as will be discussed in more detail below. Optionally, pre-stretching may occur later in the process rather than immediately after drying the hide, in which case block 104 may be omitted and the method may continue at block 106.

At 106, the hide may be finished using one or more processing steps or techniques. For example, finishing may include providing the leather material 12 with desired surface finish (such as by brushing, buffing, or embossing a grain pattern), coating an exterior surface of the leather material 12 with a glaze, polish, or protectant (such as oil or polyurethane), and/or tumbling the leather material 12 to soften the leather material 12 and/or increase flexibility.

At 108, the hide may be pre-stretched. The hide may be pre-stretched by exerting a tensile and/or compressive force on the panels as previously discussed. If the hide was previously pre-stretched at block 104, then the hide may be pre-stretched for a second time at block 108. As such, the second pre-stretching event may further elongate the leather material 12 and may provide additional stretching that may not have been realized prior to finishing at block 106. If the hide was not previously pre-stretched, then the hide may be pre-stretched for the first time at this step. Optionally, pre-stretching may occur later in the process, in which case block 108 may be omitted and the method may continue at block 110.

At 110, the hide may be finish-cut or cut into a set of panels. The hide may be cut into panels using a cutting tool, such as a blade or die, in a manner known to those skilled in the art.

At 112, the panels may be pre-stretched. The panels may be pre-stretched by exerting a tensile and/or compressive force on the panels as previously discussed. If the hide was previously pre-stretched at blocks 104 and 108, then the leather material 12 may be pre-stretched for the third time at block 112. As such, the third pre-stretching event may further elongate the leather material 12 and may provide additional stretching that may not have been realized prior to block 110. If the hide was previously pre-stretched at block 104 or block 108, then the leather material 12 may be pre-stretched for a second time at this step. If the hide was not previously pre-stretched, then the leather material 12 may be pre-stretched for the first time at this step.

At 114, one or more panels may be assembled. One or more members of the set of panels may be assembled in any suitable manner, such as by stitching multiple panels together. An article may be made by assembling panels that have been cut from one or more hides. For example, in the case of a seat trim cover multiple hides or panels from multiple hides may be used depending on the size of the trimmed surface. Alternatively, an article may be made by assembling panels from a single hide or by cutting a single finish-cut panel or piece from a hide rather than by assembling multiple panels.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of processing a leather material comprising:
providing a tanned leather material;
drying the leather material;
pre-stretching the leather material;
pre-stretching the leather material a second time before cutting the leather material into a set of panels;
cutting the leather material into the set of panels; and
assembling at least some members of the set of panels into a leather article;
wherein the step of pre-stretching the leather material occurs after drying the leather material and before assembling the panels.

2. The method of claim 1 further comprising the step of finishing the leather material after drying the leather material and before cutting the leather material into the set of panels.

3. The method of claim 2 wherein the step of pre-stretching the leather material occurs after finishing the leather material and before cutting the leather material into the set of panels.

4. The method of claim 3 further comprising pre-stretching the leather material a second time before assembling at least some members of the set of panels.

5. The method of claim 2 wherein the step of pre-stretching the leather material occurs before finishing the leather material.

6. The method of claim 5 further comprising pre-stretching the leather material a second time after finishing the leather material and before cutting the leather material.

7. The method of claim 6 further comprising pre-stretching the leather material a third time after cutting the leather material into the set of panels and before assembling at least some members of the set of panels.

8. The method of claim 2 wherein the step of finishing the leather material further comprises coating an exterior surface with polyurethane.

9. The method of claim 2 wherein the step of finishing the leather material further comprises embossing a grain pattern on the leather material.

10. A method of processing a leather material comprising:
providing a tanned leather hide;
drying the hide after tanning;
pre-stretching the hide after the hide is dried;
cutting the hide into first and second panels after pre-stretching the hide;
pre-stretching the hide a second time after cutting the hide into first and second panels; and
stitching the first and second panels together to form a leather article.

11. The method of claim 10 further comprising finishing the hide after pre-stretching the hide and before cutting the hide into first and second panels.

12. The method of claim 10 further comprising pre-stretching the hide a second time after finishing the hide.

13. The method of claim 11 further comprising pre-stretching the hide a third time after cutting the hide into first and second panels.

14. The method of claim 10 further comprising pre-stretching the hide a second time after cutting the hide into first and second panels and before stitching the first and second panels together.

15. A method of processing a leather material comprising:
providing a tanned leather material;
drying the leather material;
pre-stretching the leather material with first and second pairs of rollers such that the first and second pairs of rollers engage the leather material;
cutting the leather material into a set of panels; and
assembling at least some members of set of the panels to form a leather article;
wherein the step of pre-stretching the leather material occurs after drying the leather material and before assembling members of the set of panels.

16. The method of claim 15 wherein the leather material is fed between the first pair of rollers and the second pair of rollers such that the leather material is pre-stretched in a region located between the first and second pair of rollers.

17. The method of claim 15 wherein the second pair of rollers includes a third roller and a fourth roller, wherein the third roller rotates at a higher speed than the fourth roller.

18. The method of claim 15 wherein the second pair of rollers includes a third roller and a fourth roller, wherein the third roller has a larger diameter than the fourth roller and the third and fourth rollers each rotate about an axis of rotation at substantially a same speed.

19. The method of claim 15 wherein the second pair of rollers move away from the first pair of rollers to pre-stretch the leather material.

20. The method of claim 15 wherein the step of pre-stretching the leather material occurs after cutting the leather material into the set of panels.

* * * * *

UNITED STATES PATENT AND TRADEMARK OFFICE
CERTIFICATE OF CORRECTION

PATENT NO. : 8,776,554 B2  Page 1 of 1
APPLICATION NO. : 13/682860
DATED : July 15, 2014
INVENTOR(S) : Pusheng Chen et al.

It is certified that error appears in the above-identified patent and that said Letters Patent is hereby corrected as shown below:

In the Claims

Column 6, Line 23, Claim 15:

After "members of" delete "of set of the" and
Insert -- of the set of --.

Signed and Sealed this
Fourteenth Day of October, 2014

Michelle K. Lee
*Deputy Director of the United States Patent and Trademark Office*